(12) United States Patent
Nihei et al.

(10) Patent No.: US 8,308,419 B2
(45) Date of Patent: Nov. 13, 2012

(54) ROBOT SYSTEM USING ROBOT TO LOAD AND UNLOAD WORKPIECE INTO AND FROM MACHINE TOOL

(75) Inventors: Ryo Nihei, Minamitsuru-gun (JP); Satoshi Kinoshita, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 278 days.

(21) Appl. No.: 12/491,700

(22) Filed: Jun. 25, 2009

(65) Prior Publication Data

US 2010/0028117 A1    Feb. 4, 2010

(30) Foreign Application Priority Data

Aug. 1, 2008   (JP) .................. 2008-200170

(51) Int. Cl.
*B25J 18/00* (2006.01)
(52) U.S. Cl. ........................ 414/680; 414/735
(58) Field of Classification Search .................. 414/735, 414/680, 222.01
See application file for complete search history.

(56) References Cited

U.S. PATENT DOCUMENTS

| | | | | |
|---|---|---|---|---|
| 5,155,423 A | * | 10/1992 | Karlen et al. | 318/568.11 |
| 6,296,472 B1 | | 10/2001 | Ito et al. | |
| 6,297,611 B1 | * | 10/2001 | Todorov et al. | 318/568.21 |
| 2004/0086364 A1 | | 5/2004 | Watanabe et al. | |
| 2005/0204850 A1 | | 9/2005 | Nihei et al. | |

FOREIGN PATENT DOCUMENTS

| | | |
|---|---|---|
| CN | 1669746 | 9/2005 |
| EP | 0875353 | 11/1998 |
| EP | 1413404 | 4/2004 |
| JP | 61-004641 | 1/1986 |
| JP | 61-076286 | 4/1986 |
| JP | 62-262106 | 11/1987 |
| JP | 6-106445 | 4/1994 |
| JP | 10-95028 | 4/1998 |
| JP | 3865703 | 10/2006 |
| WO | 98/12037 | 3/1998 |

OTHER PUBLICATIONS

Japanese Notice of Reasons for Rejection mailed May 25, 2010 issued in Japanese Application No. 2008-200170.
Chinese First Office Action issued Jul. 8, 2010 issued in Chinese Application No. 200910150972.8 (including a translation thereof).
Japanese Notice of Reasons for Rejection mailed Jul. 27, 2010 issued in Japanese Application No. 2008-200170.

* cited by examiner

*Primary Examiner* — Donald Underwood
(74) *Attorney, Agent, or Firm* — Drinker Biddle & Reath LLP

(57) ABSTRACT

A robot includes a base member, which is installed at a position offset from the front of a door of a machine tool to the side, as viewed in a direction vertical to the surface where the door is provided and is fixed to a surface of a base slanted so as to face the door side. A rotary member is coupled to the base member so as to be rotatable about a first axis extending vertical to the slanted surface. A first arm member is coupled to the rotary member so as to be able to swivel about a second axis vertical to the first axis, and a second arm member is coupled to the first arm member so as to be able to swivel about a third axis parallel to the second axis.

3 Claims, 6 Drawing Sheets

ROBOT SYSTEM USING ROBOT TO LOAD AND UNLOAD WORKPIECE INTO AND FROM MACHINE TOOL

RELATED APPLICATIONS

The present application is based on, and claims priority from, Japanese Application No. 2008-200170, filed Aug. 1, 2008, the disclosure of which is hereby incorporated by reference herein in its entirety.

BACKGROUND OF THE INVENTION

1. Field of the Invention

The present invention relates to a robot system using a robot to load and unload (or place and remove) a workpiece into and from a machine tool.

2. Description of the Related Art

Known in the art is a robot system using a robot to mount a workpiece to a predetermined mounting portion of a molding machine or a machining center or other machine tool or remove a workpiece finished being processed from the mounting portion. Using such a robot system, it becomes possible to automate processing of a large number of workpieces by a machine tool.

A robot for loading and unloading a workpiece into and from a machine tool uses a mechanism combining linear movement axes and swivel arms. In particular, as a machine for taking out molded articles, at the present, Cartesian coordinate robots combining linear movement axes are generally used. While such a robot has the merit that compared with a swivel arm, complicated coordinate conversion at the time of control becomes unnecessary and the operation is easy to understand, it has the demerits that the robot easily becomes large, in particular the total height easily becomes greater, and transport separate from the molding machine easily become necessary.

FIG. 6 schematically shows a conventional robot system using a robot 50 combining swivel arms. A machine tool 60 is provided with a door 61 through which a workpiece 70 is loaded and unloaded. Robot 50 is arranged so that a base member 51 fixed to the floor surface is positioned at the front of door 61. This makes it possible to use simple, compact configuration robot 50 for efficient loading and unloading operation in machine tool 60. This is because if base member 51 is arranged at a position offset from the front of door 61, the distance from base member 51 to the inside of door 61 is longer and it tends to be necessary to lengthen the arm more, etc. Further, the arm would enter door 61 at a slant, and therefore structurally areas would easily arise inside door 61 which the front end of the arm could not reach. To position workpiece 70 at the desired area, an additional mechanism etc. tends to become necessary. For example, when robot 50 is arranged at the left side from door 61 of FIG. 6, in the illustrated configuration, the front end of the arm cannot reach the inside of the left side of the space in door 61.

Further, another conventional robot system using a robot combining swivel arms for loading and unloading a workpiece into and from a machine tool is disclosed in Japanese Unexamined Patent Publication No. 10-95028. In this prior art, the robot is mounted on the machine tool. In this case as well, the robot can be placed at a suitable position near the mounting portion for the workpiece, is simple and compact in configuration, and can be configured to enable suitable loading and unloading operations.

Further, Japanese Unexamined Patent Publication No. 6-106445 and Japanese Patent No. 3865703 disclose a robot system configured to enable a robot to move along rails extending among a plurality of machine tools and to load and unload workpieces into and from a plurality of machine tools by a single robot. In this case, suitable loading and unloading operations can be carried out by moving the robot to suitable positions with respect to the machine tools.

In the robot system shown in FIG. 6, when at the time of changing workpieces 70, at the time of maintenance, etc., a worker sometimes performs work at machine tool 60. In this kind of work, it is often necessary to adjust and inspect the mounting portion, holding mechanism, etc. for workpiece 70, and therefore such work is usually performed at the front of door 61 of machine tool 60. For this reason, in machine tool 60, an operating panel 62 is provided at the side surface where door 61 is provided. At the time of this type of work, if robot 50 were at the front of door 61, the work space would be narrow and work would be difficult.

On the other hand, in the configuration disclosed in Japanese Unexamined Patent Publication No. 10-95028, a robot for loading and unloading a workpiece into and from a machine tool is arranged on the machine tool and therefore, at the time of maintenance and other work, the robot will never cause the work space to become narrower. However, a robot which can be arranged on a machine tool is limited in weight and size and therefore, when handling a large workpiece, it is difficult to use such a configuration. Further, since it is necessary to make the robot comparatively small, the processing range of the robot also tends to become narrower. For this reason, there also tend to be limits to the layout of the device for supplying and carrying out the workpieces.

Further, as shown in Japanese Unexamined Patent Publication No. 6-106445 and Japanese Patent No. 3865703, if the robot is configured to be movable along rails, at the time of maintenance and other work, it is possible to make the robot move to secure the work space at the front of the door of the machine tool for loading and unloading workpieces. However, in a configuration using one robot for one machine tool, using rails for movement of the robot is considerably costly and not necessarily preferable.

SUMMARY OF THE INVENTION

Accordingly, an object of the present invention is to provide a robot system for loading and unloading a workpiece into and from a machine tool, which has a new configuration and can secure work space for maintenance etc. of the machine tool at the front of a door of the machine tool through which a workpiece is loaded and unloaded.

To achieve the above object, according to the present invention, there is provided a robot system using a robot to load and unload a workpiece into and from a machine tool, the machine tool having a door through which a workpiece is loaded and unloaded, wherein the robot includes a base member installed at a position offset from a front of the door, as viewed in a direction vertical to a surface of the machine tool where the door is provided, a rotary member coupled to the base member so as to be rotatable about a first axis, a first arm member coupled to the rotary member so as to be able to swivel about a second axis vertical to the first axis, and a second arm member coupled to the first arm member so as to be able to swivel about a third axis parallel to the second axis; and wherein the first axis extends slanted with respect to the vertical direction so as to head toward the door side the further toward the top, as viewed in a direction vertical to the surface where the door is provided.

According to this configuration, the base member is installed at a position offset from the door. Therefore, if the first and second arm members is pulled in so as to fold up, the robot can be made to retract from the front of the door. Further, since the first axis is slanted to head to the door side, the front end of the second arm member can be made to naturally reach a broad range of positions of the machine tool inside the door.

In the above robot system, it is preferable that the second arm member has a base part coupled to the first arm member so as to be rotatable about the third axis, and a shaft part coupled to the base part so as to be rotatable about a fourth axis vertical to the third axis, and that the robot further includes a holding mechanism holding the workpiece, which holding mechanism has a base part coupled to the shaft part of the second arm member so as to be able to swivel about a fifth axis vertical to the fourth axis, and a terminal end attached to the base part so as to be rotatable about a sixth axis vertical to the fifth axis and provided with a holding part for the workpiece. This makes it possible to suitably adjust the posture of the workpiece at the time of loading and unloading into and from the machine tool.

According to the robot system of the present invention, it is possible to make the robot retract from the front of the door for loading and unloading of workpieces of the machine tool. Due to this, it is possible to secure work space for maintenance etc. of a machine tool. Still further, a robot having a simple configuration can be used to make the front end of the arm member reach a desired position inside the door of the machine tool and suitably load and unload a workpiece into and from the machine tool.

BRIEF DESCRIPTION OF THE DRAWINGS

The above and other objects, features, and advantages of the present invention will be described below in more detail based on preferred embodiments of the present invention with reference to the accompanying drawings, in which.

DETAILED DESCRIPTION

Preferred embodiments of the present invention will be described below with reference to the drawings.

Figure 1:
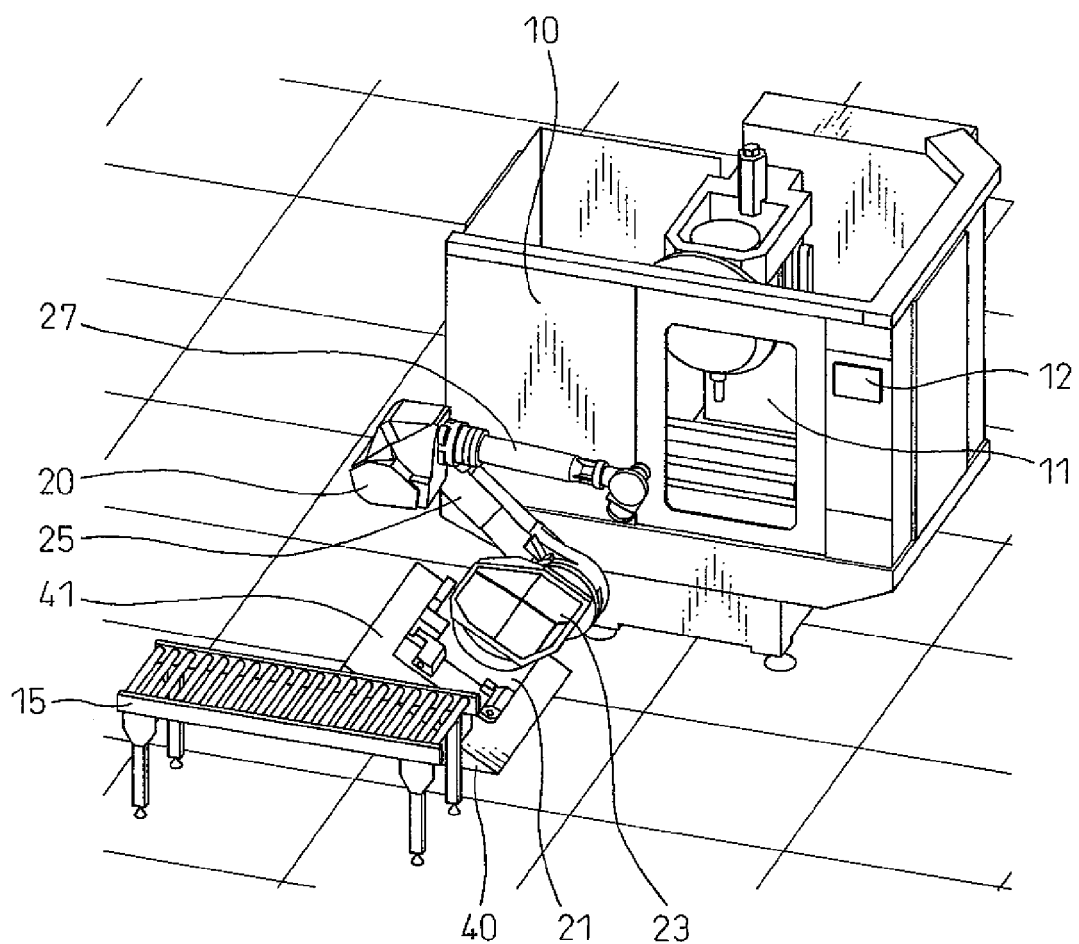
FIG. 1 is a perspective view schematically showing an embodiment of a robot system according to the present invention.

FIG. 1 is a perspective view schematically showing the overall configuration of a robot system of the present embodiment. As illustrated, the robot system of the present embodiment is configured using one robot 20 for one machine tool 10.

Machine tool 10 may be a molding machine, machining center, or any other known type of machine for fabricating a molded part as a workpiece or connecting a molded part to, machining, or performing other processing on a supplied workpiece. Since details of machine tool 10 are not directly related to the present invention, an explanation thereof will be omitted. Whatever the case, machine tool 10 has a door 11 through which a not shown workpiece can be loaded and unloaded. Further, near door 11 on the side surface of machine tool 10 where door 11 is provided, an operating panel 12 is disposed. While not shown in detail, inside door 11, there is provided a holding part which includes a processing table and fixtures for holding the workpiece during processing.

Robot 20 operates to load and unload a workpiece into and from machine tool 10. Specifically, robot 20 grabs a workpiece conveyed by a conveyor 15, inserts it through door 11 into machine tool 10, and mounts it to the holding part of machine tool 10; and/or grabs a workpiece processed by machine tool 10, removes it from the holding part of machine tool 10, takes it out from machine tool 10 through door 11, and places it on conveyor 15.

Robot 20 is fixed on a base 40 installed on a floor surface on which machine tool 10 is installed. Base 40 is arranged at a position facing the side surface of machine tool 10 where door 11 is provided and being offset from the front of door 11, as viewed in a direction vertical to this side surface, to the side (in the example shown in FIG. 1, the left side). The surface of base 40 to which robot 20 is fixed, as viewed in a direction vertical to the side surface where door 11 is provided, is a slanted surface 41 slanted from the floor surface in the direction toward door 11 (in the example shown in FIG. 1, to raise the left side end and face the right side).

Figure 2:
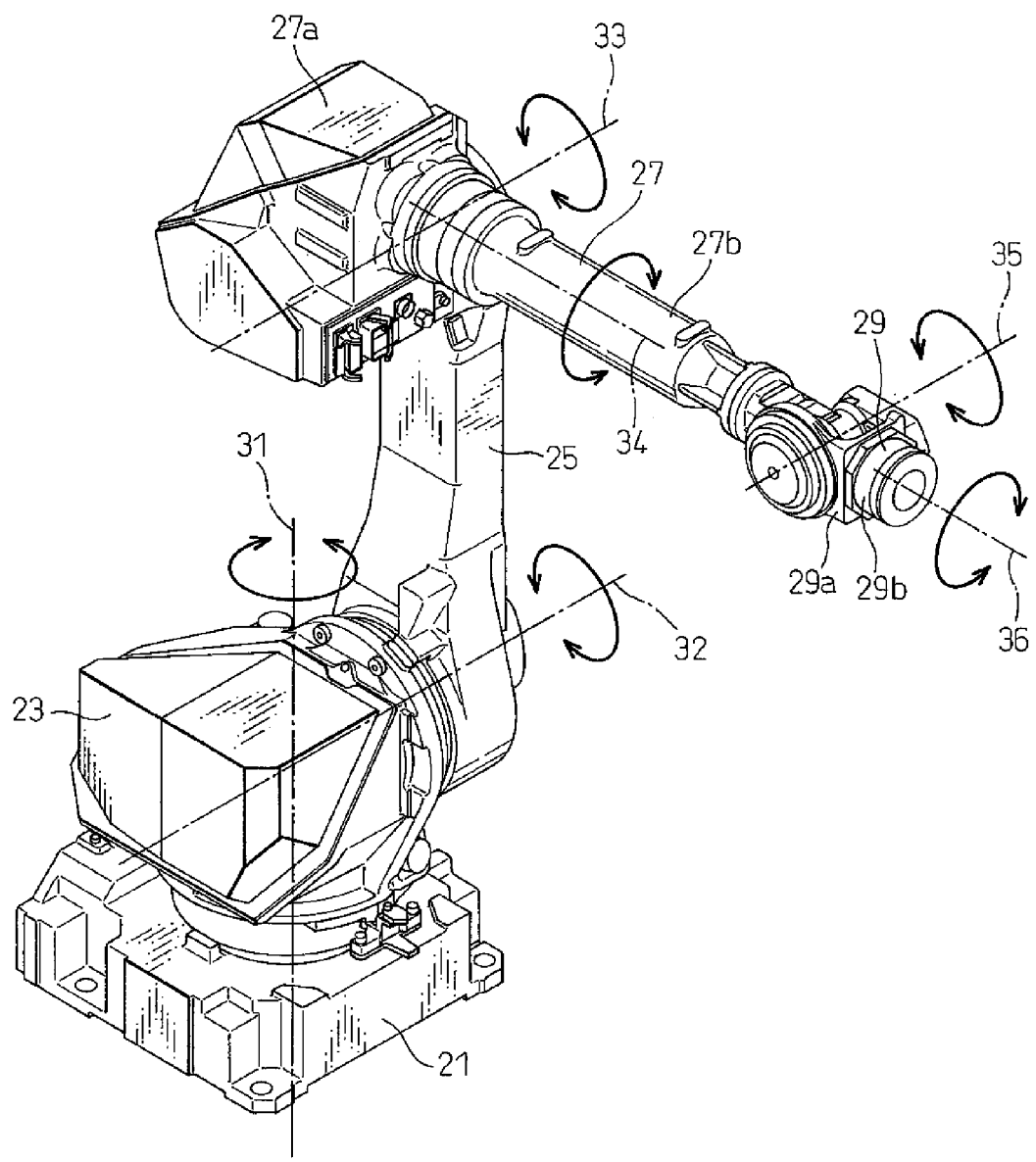
FIG. 2 is a perspective view showing in more detail a robot in the robot system of FIG. 1.

FIG. 2 shows details of the configuration of robot 20 of FIG. 1. As illustrated, robot 20 has a substantially rectangular parallelepiped-shaped base member 21 fixed on slanted surface 41 of base 40. The base member 21 has a rotary member 23 connected thereto so as to be rotatable about a first axis 31 vertical to the bottom surface of base member 21. Rotary member 23 has one end of a first arm member 25 connected thereto so as to be able to swivel about a second axis 32 vertical to first axis 31. One end of a second arm member 27 is coupled to the other end of first arm member 25 so as to be able to swivel about a third axis 33 parallel to second axis 32.

In this way, robot 20 has a so-called "serial link mechanism" comprised of serially linked rotating mechanisms. This makes it possible to arrange the front end of second arm member 27 at any position by adjusting the angular positions about first to third axes 31 to 33.

Second arm member 27 has a base part 27a linked to be able to rotate about third axis 33, and a shaft part 27b coupled to base part 27a so as to be rotatable about a fourth axis 34 vertical to third axis 33 and extending along fourth axis 34. At the front end of shaft part 27b, a holding mechanism 29 for holding the workpiece is coupled. Holding mechanism 29 has a base part 29a coupled to the front end of shaft part 27b so as to be able to swivel about a fifth axis 35 vertical to fourth axis 34, and a terminal end 29b coupled to base part 29a so as to be rotatable about a sixth axis 36 vertical to fifth axis 35. A not shown hand mechanism is attached to the terminal surface of terminal end 29b facing the direction of sixth axis 36, so that the workpiece is held by the hand mechanism.

In this way, the rotating mechanisms about fourth to sixth axes 34 to 36 also form another serial link mechanism. This makes it possible to adjust the orientation of the workpiece holding surface of terminal end 29b and therefore the posture of the workpiece to any posture by adjusting the angular positions about fourth to sixth axes 34 to 36.

In such a configuration of robot 20, base member 21 is fixed and set, as described above, on slanted surface 41 of base 40. As a result, first axis 31 extends vertical to slanted surface 41 and, as viewed in a direction vertical to the surface where door 11 is provided, is slanted with respect to the vertical direction to head toward door 11 side of machine tool 10 the more toward the top, that is, to the right side of the figure.

Next, referring to FIGS. 3 and 4, the operation of robot 20 of the present embodiment will be described.

Figure 3:
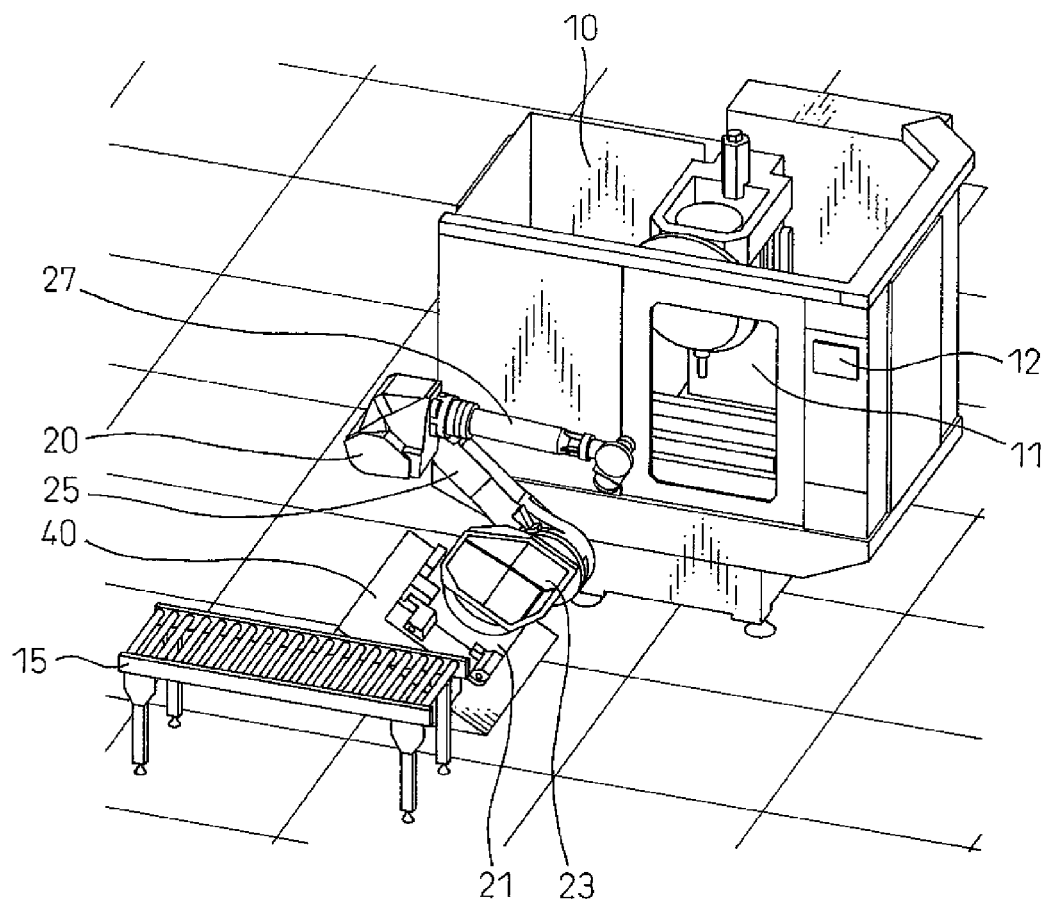
FIG. 3 is a perspective view showing the state in which the robot in the robot system of FIG. 1 is in the standby posture.

FIG. 3 shows the standby posture of robot 20. In this standby posture, first arm member 25 is made to swivel about second axis 32 to an angular position substantially parallel to the bottom surface of base member 21. The angular position about first axis 31 need only be one where first arm member 25 extends from rotary member 23 in a direction different from door 11 side of machine tool 10. In the example shown in FIG. 3, the angular position about first axis 31 is one where first arm member 25 extends to the side opposite to door 11 side, i.e., to the left side of FIG. 3. Second arm member 27 is made to swivel about third axis 33 to an angular position close to being parallel to first arm member 25 and extends from first arm member 25 to be folded back at third axis 33. As a result, second arm member 27 is positioned with its front end substantially on the extension of first axis 31 and does not stick out much at all to door 11 side.

By setting robot 20 in the standby posture shown in FIG. 3 in this way, robot 20 as a whole can be retracted from the front of door 11 of machine tool 10. That is, all parts of robot 20 can be prevented from overlapping door 11 in a direction vertical to the side surface of machine tool 10 where door 11 is provided. Therefore, in the state shown in FIG. 3, it is possible to keep robot 20 from getting in the way when a worker accesses the inside of machine tool 10 through door 11 to perform maintenance or other work on machine tool 10.

Further, since robot 20 is positioned at the opposite side of door 11 from operating panel 12, even when the worker operates operating panel 12, robot 20 will not get in the way. However, since often not that wide a space is required in front of operating panel 12, it is also possible not to arrange robot 20 and operating panel 12 on the opposite sides. It is also possible to configure the system to lower the posture of robot 20 and increase the space in front of operating panel 12.

Figure 4:
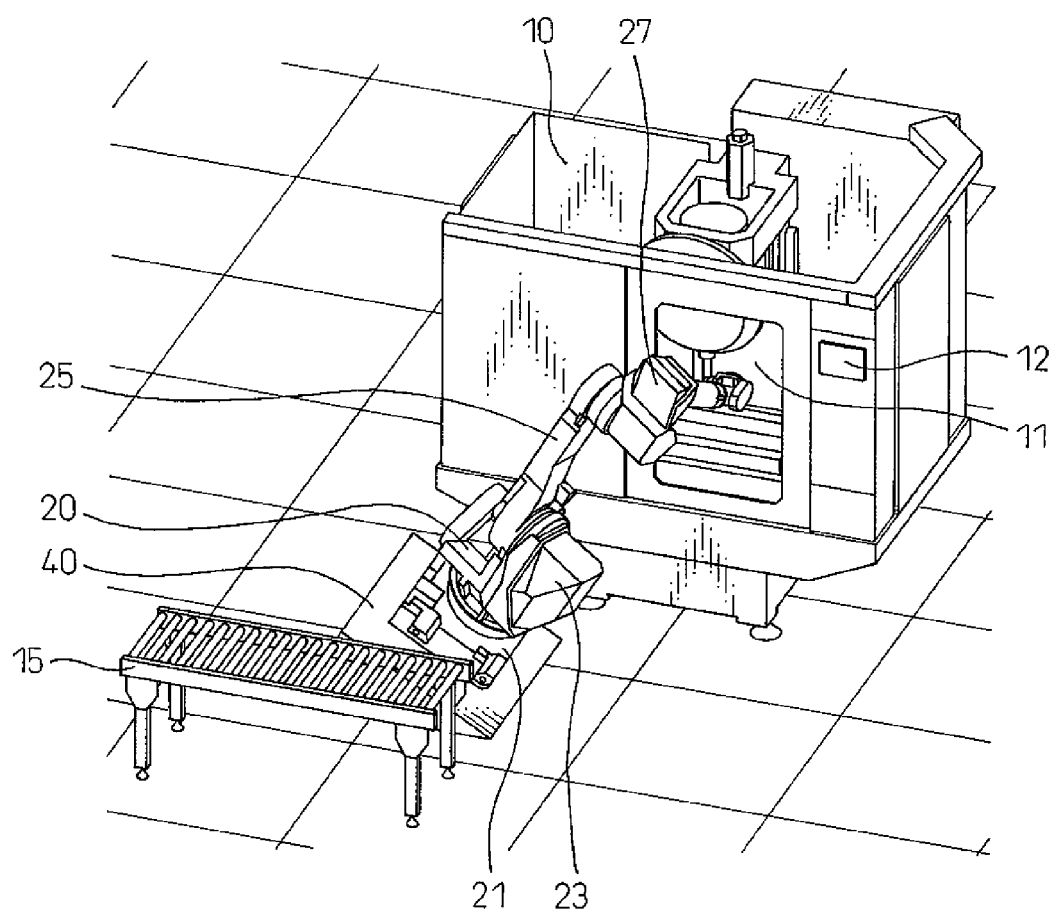
FIG. 4 is a perspective view showing the state in which the robot in the robot system of FIG. 1 is at a loading/unloading position where a workpiece is loaded into and unloaded from a machine tool.

Next, FIG. 4 shows the state in which robot 20 loads and unloads a workpiece into and from machine tool 10. At this time, the angular position about first axis 31 is a position where the line vertical to second axis 32 heads toward door 11 side of machine tool 10. When the angular position about first axis 31 is in this position, by making first arm member 25 swivel about second axis 32, it is possible to make first arm member 25 extend toward door 11 side. Further, second arm member 27 can also be made to swivel about third axis 33 so as to increase the angle between first arm member 25 and second arm member thereby be set in a state in which second arm member 27 extends toward door 11 side. Due to this, holding mechanism 29 of the front end of second arm member 27 can be made to reach inside door 11 of machine tool 10.

At this time, first axis 31 extends slanted to door 11 side. Therefore, as viewed in the plane parallel to the surface where door 11 is provided, first and second arm members 25, 27 can be made to extend straight toward door 11 side without being bent at the joint of the two. For this reason, compared with the case where robot 20 is arranged so that first axis 31 extends vertically, even if first and second arm members 25, 27 are not lengthened much, the front end of second arm member 27 can be made to reach the desired position in door 11. Therefore, robot 20 can be configured relatively compactly.

Further, by suitably setting the position of base 40, the angle of slanted surface 41, the length of first arm member 25, etc., it is possible to position the joint of first arm member 25 and second arm member 27 so as to be superposed at door 11 in the direction vertical to the surface where door 11 is provided (in the illustrated example, at the right side from the edge of door 11 at the side where robot 20 is arranged, that is, at the left side). At this time, third axis 33 extends slanted with respect to the vertical direction. Therefore, by making second arm member 27 swivel about third axis 33, the front end of second arm member 27 can be positioned in the horizontal direction to robot 20 side from the joint of first arm member 25 and second arm member 27 (the left side in the illustrated example). As a result, holding mechanism 29 at the front end of second arm member 27 can be made to reach up to a position at robot 20 side from the edge of door 11 at robot 20 side (in the illustrated example, the left side) in the machine tool 10, as viewed in a direction vertical to the surface where door 11 is provided. This is impossible if robot 20 is arranged so that first axis 31 extends vertically. As viewed in the direction vertical to the surface where door 11 is provided, by configuring first axis 31 to extend slanted to door 11 side in this way, it is possible to widely secure the region in machine tool 10 which robot 20 can access.

Figure 5:
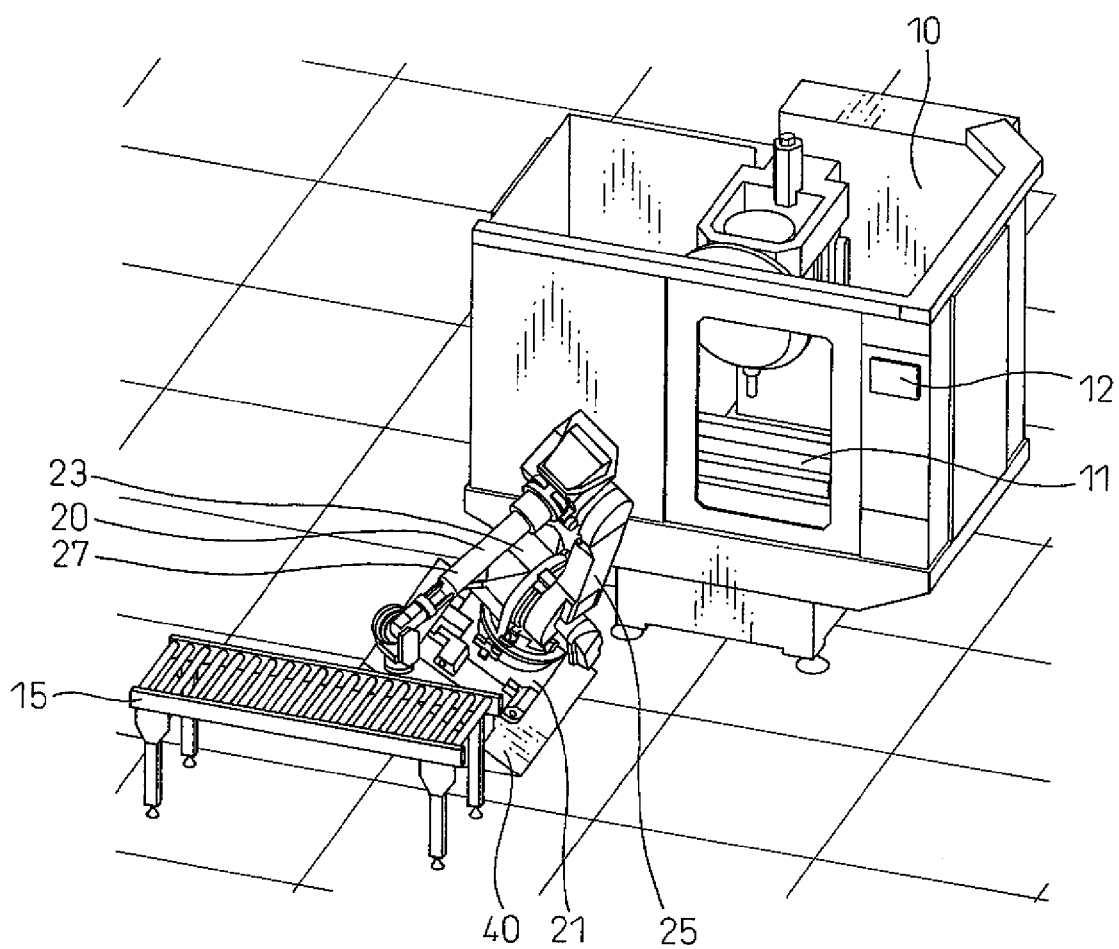
FIG. 5 is a perspective view showing the state in which the robot in the robot system of FIG. 1 is at a transfer position where a workpiece is transferred to a conveyor.
Figure 6:
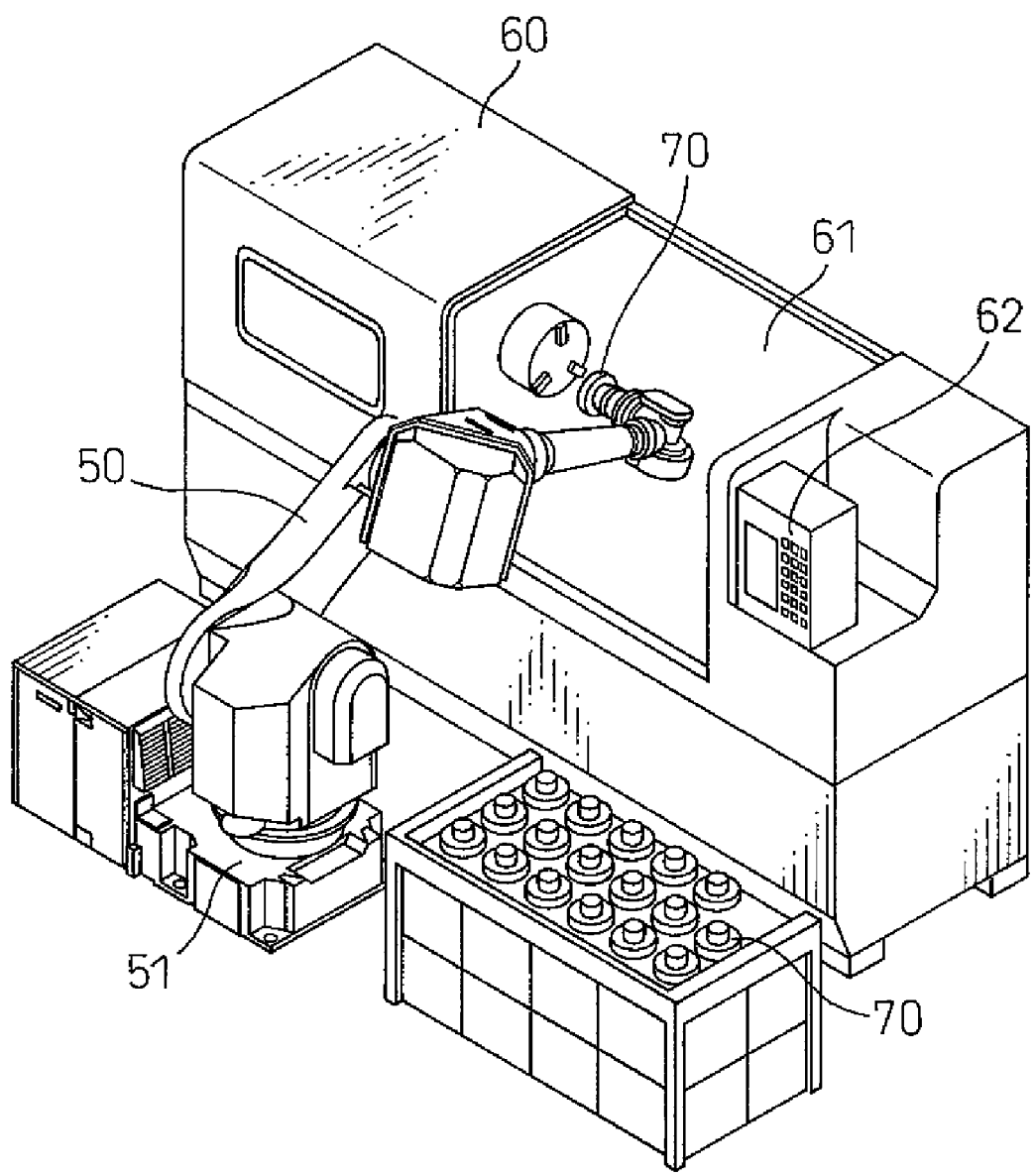
FIG. 6 is a perspective view schematically showing a conventional robot system.

Next, FIG. 5 shows the state in which robot 20 is used to pick up a workpiece from conveyor 15 or place a workpiece finished being processed by machine tool 10 on conveyor 15. In the illustrated example, conveyor 15 is arranged at the opposite side of robot 20 from machine tool 10. Robot 20 accesses conveyor 15 in the state where robot 20 is rotated substantially about 180 degrees about first axis 31 from the state shown in FIG. 4. The arrangement of conveyor 15 is not limited to the illustrated arrangement. Conveyor 15 may be arranged at either the left or right side of machine tool 10. As will be understood, even with this arrangement, robot 20 can access conveyor 15 without any problem. In this way, in the configuration of the present embodiment, the arrangement of conveyor 15 is not particularly limited.

As described above, according to the present embodiment, in the robot system using robot 20 to load and unload the workpiece into and from machine tool 10, it is possible to make robot 20 retract from the front of door 11 at the time of standby of robot 20. This makes it possible to keep robot 20 from getting in the way when a worker is accessing the inside of machine tool 10 through door 11 to perform maintenance or other work on machine tool 10.

At this time, robot 20 is installed on the floor surface separate from machine tool 10. Therefore, there are no restrictions on weight or size like in the case of placing robot 20 on machine tool 10. For this reason, large sized, heavy workpieces can be handled. Further, there is no limit on the arrangement of devices for supplying and carrying out workpieces.

Further, robot 20 can naturally access the inside of machine tool 10, without using any special mechanism or becoming large in size, by using a simple mechanism serially linking mechanisms rotating about first to third axes 31 to 33 to make first axis 31 slant toward door 11 side of machine tool 10. In particular, robot 20 can access a wide range of positions in machine tool 10.

Note that the above embodiment illustrates the examples of the present invention and various changes can be made within the scope of the present invention defined in the claims.

For example, in the above embodiment, robot 20 having mechanisms rotating about fourth to sixth axes 34 to 36 has been shown. According to this configuration, at the time of loading and unloading of a workpiece into and from machine tool 10 or at the time of receiving or returning a workpiece from or to conveyor 15, the posture of the workpiece can be adjusted to a suitable posture, and therefore this is preferable. However, when the posture of the workpiece does not become that much of an issue, it is also possible to omit the mechanisms rotating about fourth to sixth axes 34 to 36. Further, when positioning second arm member 27 at the position for loading and unloading of the workpiece into and from machine tool 10 or the position for transfer to conveyor 15, the holding mechanism of the workpiece may be fixed at a predetermined position and posture with respect to second arm member 27 so that the workpiece becomes a suitable posture.

Further, it is possible to configure the system so as to combine extending and contracting mechanisms in addition to the rotating mechanisms. This makes it possible to enlarge the possible range of operation of the robot even more.

In the above embodiment, the configuration in which robot 20 is installed on base 40 provided with slanted surface 41 has been shown. According to this configuration, by using various bases 40 different in angle of inclination of slanted surface 41 etc., the advantage can be obtained that it is possible to use a common robot 20 to realize configurations suitable for various systems. However, it is possible to configure base member 21 so as to have a slanted top surface and configure first axis 31 so as to be vertical to the slanted top surface of base member 21. Alternatively, it is also possible to configure first axis 31 so as to stick out at a slant from the first horizontal top surface of base member 21.

Further, the slant direction of first axis 31 does not have to be strictly parallel to the plane in which the door is provided. It is also possible to consider the arrangement of the conveyor and other peripheral equipment etc. and give a certain angle with respect to the horizontal plane. This does not obstruct the achievement of the object of the present application at all.

The invention claimed is:

1. A robot system using a robot to load and unload a workpiece into and from a machine tool, said machine tool having a door in a side of the machine tool through which a workpiece is loaded and unloaded, wherein said robot includes a base member installed at a position offset from a front of said door in the horizontal direction so that all parts of said robot can be prevented from overlapping said door, as viewed in a direction vertical to a side surface of said machine tool where said door is provided, a rotary member coupled to said base member so as to be rotatable about a first axis, a first arm member coupled to said rotary member so as to be able to swivel about a second axis perpendicular to said first axis, and a second arm member coupled to said first arm member so as to be able to swivel about a third axis parallel to said second axis;

wherein said first axis extends slanted with respect to the vertical direction so as to head toward said door, as viewed in a direction perpendicular to the side surface of said machine tool where said door is provided;

wherein the robot is fixed on the base member installed on a floor surface on which the machine tool is installed; the base member is arranged at a position facing the side surface of the machine tool where the door is provided and being offset from the front of the door, as viewed in a direction perpendicular to the side surface; the surface of the base to which the robot is fixed, as viewed in a direction perpendicular to the side surface where the door is provided, is a slanted surface slanted downward toward the floor surface in the direction toward the door; and the base member is fixed on the slanted surface of the base.

2. The robot system according to claim 1, wherein said second arm member has a base part coupled to said first arm member so as to be rotatable about said third axis, and a shaft part coupled to said base part so as to be rotatable about a fourth axis perpendicular to said third axis, and wherein said robot further includes a holding mechanism holding said workpiece, said holding mechanism having a base part coupled to said shaft part of said second arm member so as to be able to swivel about a fifth axis perpendicular to said fourth axis, and a terminal end attached to said base part so as to be rotatable about a sixth axis perpendicular to said fifth axis and provided with a holding part for holding said workpiece.

3. The robot system according to claim 1, wherein the number of the robot is one and the number of the machine tool is one.

* * * * *